US011244294B2

(12) United States Patent
Li et al.

(10) Patent No.: US 11,244,294 B2
(45) Date of Patent: Feb. 8, 2022

(54) DATA INFORMATION TRANSACTION METHOD AND SYSTEM

(71) Applicant: Huawei Technologies Co., Ltd., Shenzhen (CN)

(72) Inventors: Yingtao Li, Shenzhen (CN); Li Qian, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 547 days.

(21) Appl. No.: 15/415,970

(22) Filed: Jan. 26, 2017

(65) Prior Publication Data

US 2017/0132589 A1  May 11, 2017

Related U.S. Application Data

(63) Continuation of application No. PCT/CN2015/073494, filed on Mar. 2, 2015.

(30) Foreign Application Priority Data

Aug. 1, 2014 (CN) .......................... 201410378087.6

(51) Int. Cl.
*G06Q 20/10* (2012.01)
*G06F 16/245* (2019.01)
(Continued)

(52) U.S. Cl.
CPC ........... *G06Q 20/10* (2013.01); *G06F 16/245* (2019.01); *G06F 16/9535* (2019.01);
(Continued)

(58) Field of Classification Search
CPC .............. G06Q 50/01; G06Q 30/0269; G06Q 10/1053; G06Q 20/10; G06Q 30/0201;
(Continued)

(56) References Cited

U.S. PATENT DOCUMENTS

2001/0013037 A1    8/2001   Matsumoto
2001/0020242 A1    9/2001   Gupta et al.
(Continued)

FOREIGN PATENT DOCUMENTS

CN        101996384 A     3/2011
CN        102549614 A     7/2012
(Continued)

OTHER PUBLICATIONS

Intelius, Intelius.com, Jul. 2014 (Year: 2014).*
(Continued)

*Primary Examiner* — Abdulmajeed Aziz
(74) *Attorney, Agent, or Firm* — Conley Rose, P.C.

(57) ABSTRACT

A data information transaction method and system including receiving a query request that is sent by a terminal of a data requester and carries a query condition and a user characteristic identifier of a digital human that needs to meet the query condition, determining user characteristic information that is of a digital human and corresponding to the query condition and the user characteristic identifier, obtaining a query result, sending the query result to the terminal of the data requester, receiving a purchase request sent by the terminal of the data requester, and completing a transaction according to the purchase request.

16 Claims, 3 Drawing Sheets

(51) Int. Cl.
| | | |
|---|---|---|
| *G06F 21/62* | (2013.01) | |
| *G06Q 30/06* | (2012.01) | |
| *G06Q 30/02* | (2012.01) | |
| *G06F 16/9535* | (2019.01) | |

(52) U.S. Cl.
CPC .......... *G06F 21/62* (2013.01); *G06F 21/6218* (2013.01); *G06Q 30/0201* (2013.01); *G06Q 30/0631* (2013.01)

(58) Field of Classification Search
CPC .............. G06Q 30/0631; G06F 16/245; G06F 16/9535; G06F 21/62; G06F 21/6218
See application file for complete search history.

(56) References Cited

U.S. PATENT DOCUMENTS

| | | | |
|---|---|---|---|
| 2003/0182277 | A1 | 9/2003 | Kurakake |
| 2006/0074883 | A1 | 4/2006 | Teevan et al. |
| 2006/0248021 | A1* | 11/2006 | Jain ........................ G06Q 10/10 705/75 |
| 2007/0061195 | A1 | 3/2007 | Liu et al. |
| 2009/0254971 | A1 | 10/2009 | Herz et al. |
| 2010/0262547 | A1 | 10/2010 | Yariv et al. |
| 2011/0071997 | A1* | 3/2011 | Sullivan .............. G06F 16/9566 707/706 |
| 2014/0344953 | A1* | 11/2014 | Roundtree .............. G06F 21/10 726/28 |
| 2015/0019566 | A1* | 1/2015 | Jones .................. G06F 16/3322 707/748 |
| 2015/0032578 | A1* | 1/2015 | Bicer ...................... H04L 63/18 705/26.82 |

FOREIGN PATENT DOCUMENTS

| | | | |
|---|---|---|---|
| CN | 102842094 | A | 12/2012 |
| CN | 103377336 | A | 10/2013 |
| CN | 103632294 | A | 3/2014 |
| CN | 103942271 | A | 7/2014 |
| JP | 2001222601 | A | 8/2001 |
| JP | 2001338158 | A | 12/2001 |
| JP | 2003527644 | A | 9/2003 |
| JP | 2009508275 | A | 2/2009 |
| KR | 20100091922 | A | 8/2010 |
| WO | 2012090661 | A1 | 7/2012 |

OTHER PUBLICATIONS

Intelius, Intelius.com, Jul. 2014 (Year: 2014).*
Angwin, "What Do Data Brokers Know About Me?", Slate.com, Mar. 2014. (Year: 2014).*
Machine Translation and Abstract of Chinese Publication No. CN101996384, Mar. 30, 2011, 5 pages.
Machine Translation and Abstract of Chinese Publication No. CN103632294, Mar. 12, 2014, 5 pages.
Machine Translation and Abstract of Chinese Publication No. CN103942271, Jul. 23, 2014, 5 pages.
Foreign Communication From a Counterpart Application, PCT Application No. PCT/CN2015/073494, English Translation of International Search Report dated May 21, 2015, 2 pages.
Foreign Communication From a Counterpart Application, PCT Application No. PCT/CN2015/073494, English Translation of Written Opinion dated May 21, 2015, 9 pages.
Machine Translation and Abstract of Korean Publication No. KR20100091922, Aug. 19, 2010, 17 pages.
Hyun-Ah, K., "Personal information, value for money" Economy, Financial and Securities, Jan. 24, 2014, 3 pages.
English Translation of Hyun-Ah, K., "Personal information, value for money" Economy, Financial and Securities, Jan. 24, 2014, 3 pages.
Foreign Communication From a Counterpart Application, Korean Application No. 10-2017-7004727, Korean Office Action dated May 18, 2018, 4 pages.
Foreign Communication From a Counterpart Application, Korean Application No. 10-2017-7004727, English Translation of Korean Office Action dated May 18, 2018, 3 pages.
Foreign Communication From a Counterpart Application, European Application No. 15827413.4, Extended European Search Report dated Jun. 29, 2017, 11 pages.
Machine Translation and Abstract of Japanese Publication No. JP2001338158, Dec. 7, 2001, 8 pages.
Foreign Communication From a Counterpart Application, Japanese Application No. 2017-505531, Japanese Notice of Rejection dated Dec. 11, 2018,4 pages.
Foreign Communication From a Counterpart Application, Japanese Application No. 2017-505531, English Translation of Japanese Notice of Rejection dated Dec. 11, 2018, 5 pages.
Machine Translation and Abstract of Chinese Publication No. CN103377336, Oct. 30, 2013, 20 pages.
Foreign Communication From a Counterpart Application, Chinese Application No. 201410378087.6, Chinese Office Action dated Feb. 23, 2018, 5 pages.
Machine Translation and Abstract of International Publication No. WO2012090661, Jul. 5, 2012, 26 pages.
Foreign Communication From a Counterpart Application, Japanese Application No. 2017-505531, Japanese Notice of Rejection dated May 8, 2018, 4 pages.
Foreign Communication From a Counterpart Application, Japanese Application No. 2017-505531, English Translation of Japanese Notice of Rejection dated May 8, 2018,4 pages.

* cited by examiner

| A server receives a query request sent by a terminal of a data requester, where the query request includes a query condition and a user characteristic identifier of a digital human that needs to meet the query condition, the digital human is used to describe, in a digital world environment, a characteristic of an actual user in the physical world, and the user characteristic identifier is a characteristic category identifier obtained by classifying user characteristic information included in the digital human | ~101 |

↓

| The server determines user characteristic information that is of a digital human and corresponding to the query condition and the user characteristic iDentifier, obtains a query result according to an access permission setting parameter of the user characteristic information of the digital human, and sends the query result to the terminal of the data requester | ~102 |

↓

| The server receives a purchase request that is sent by the terminal of the data requester according to the query result, and completes a transaction according to the purchase request, where the purchase request is used to instruct to purchase the user characteristic information of the digital human corresponding to the query result | ~103 |

FIG. 1

DATA INFORMATION TRANSACTION METHOD AND SYSTEM

CROSS-REFERENCE TO RELATED APPLICATIONS

This application is a continuation of International Application No. PCT/CN2015/073494, filed on Mar. 2, 2015, which claims priority to Chinese Patent Application No. 201410378087.6, filed on Aug. 1, 2014. The disclosures of the aforementioned applications are hereby incorporated by reference in their entireties.

TECHNICAL FIELD

Embodiments of the present disclosure relate to the field of Internet big data application technologies, and in particular, to a data information transaction method and system.

BACKGROUND

With the continuous development of mobile terminals and the mobile Internet, currently, various network application services increasingly affect people's living habits. People use user terminals to perform activities related to network application, such as online shopping, establishment of a social network, and posting a microblog. Therefore, massive end user data is distributed on a network, where the user data is mixed up with massive network information.

Because the user data includes characteristic information, such as a behavioral habit, of corresponding users, when a user searches, by using a network, for another piece of user data that the user expects to obtain, so as to use the user data as a reference of a behavior of the user, a search for the target user data is performed in such massive network information. An existing manner for searching for target information is: a keyword is input by using a search engine, and the search engine retrieves, by using web crawler software and according to the keyword input by a user, information that matches the input keyword from massive network information, and displays the retrieved information.

Generally, a quantity of information retrieved by means of such massive retrieval is quite large, where a displayed retrieval result may include several dozens of web pages, or even possibly, the retrieved information does not include target user data that a user wants to search for, which wastes the user's time and has relatively low retrieval efficiency; moreover, because the user data may be possessed by some proprietary portals or websites, the user data is missing in retrieval space of a common user, which causes an inaccurate final retrieval result.

SUMMARY

Embodiments of the present disclosure provide a data information transaction method and system, so as to implement that an information requester can acquire, by means of a transaction, user characteristic information that the requester expects to obtain, thereby improving accuracy of a query result of user characteristic information and query efficiency.

A first aspect of the embodiments of the present disclosure provides a data information transaction system, including a data processing platform, configured to acquire a data source, and extract a digital human according to the data source, where the data source is user data of an actual user, and the digital human is configured to describe, in a digital world environment, a characteristic of the actual user in the physical world; a permission management platform, configured to receive a permission management request that is sent by a terminal of a data provider and carries an identifier of the data provider and an access permission setting parameter, and set, according to the access permission setting parameter, access permission for user characteristic information included in a digital human corresponding to the identifier of the data provider; a query management platform, configured to receive a query request that is sent by a terminal of a data requester and carries a query condition and a user characteristic identifier of a digital human that needs to meet the query condition, determine user characteristic information that is of a digital human and corresponding to the query condition and the user characteristic identifier, obtain a query result according to an access permission setting parameter of the user characteristic information of the digital human, and send the query result to the terminal of the data requester, where the user characteristic identifier is a characteristic category identifier obtained by classifying user characteristic information included in the digital human; and a transaction payment platform, configured to receive a purchase request that is sent by the terminal of the data requester according to the query result, and complete a transaction according to the purchase request, where the purchase request is configured to instruct to purchase the user characteristic information of the digital human corresponding to the query result.

In a first possible implementation manner of the first aspect, the query management platform is further configured to determine, according to the access permission setting parameter of the user characteristic information of the digital human, whether the terminal of the data requester can access the user characteristic information of the digital human; and if the terminal of the data requester can access the user characteristic information of the digital human, send the query result to the terminal of the data requester; where the query result includes at least one of the following results: a quantity of the user characteristic information of the digital human, and a part of user characteristic information of the digital human in the user characteristic information of the digital human.

According to the first aspect or the first possible implementation manner of the first aspect, in a second possible implementation manner of the first aspect, the query management platform is further configured to determine at least two digital humans corresponding to the query condition; perform data mining analysis on user characteristic information, corresponding to the user characteristic identifier, in the at least two digital humans to obtain common user characteristic information; and obtain the query result according to access permission setting parameters of pieces of user characteristic information included in the common user characteristic information.

According to the second possible implementation manner of the first aspect, in a third possible implementation manner of the first aspect, the query management platform is further configured to determine the at least two digital humans corresponding to the query condition, where the query condition includes a retrieval keyword input by the data requester, the query condition includes the retrieval keyword and context environment information of the terminal of the data requester, or the query condition includes the retrieval keyword and at least one piece of user characteristic information included in a digital human corresponding to the data requester; perform data mining analysis on the user characteristic information, corresponding to the user characteristic identifier, in the at least two digital humans to obtain the common user characteristic information; and obtain the query result according to the access permission setting parameters of the pieces of user characteristic information included in the common user characteristic information.

According to the first aspect, or the first, the second, or the third possible implementation manner of the first aspect, in a fourth possible implementation manner of the first aspect, the permission management platform is further configured to perform identity authentication on the data provider according to the identifier of the data provider, and after the authentication succeeds, perform the step of setting, according to the access permission setting parameter, access permission for user characteristic information included in a digital human corresponding to the identifier of the data provider.

According to the first aspect, or the first, the second, or the third possible implementation manner of the first aspect, in a fifth possible implementation manner of the first aspect, the system further includes a memory, where the memory stores the data source obtained by the data processing platform and the digital human extracted according to the data source.

A second aspect of the embodiments of the present disclosure provides a data information transaction method, including receiving, by a server, a query request sent by a terminal of a data requester, where the query request includes a query condition and a user characteristic identifier of a digital human that needs to meet the query condition, the digital human is used to describe, in a digital world environment, a characteristic of an actual user in the physical world, and the user characteristic identifier is a characteristic category identifier obtained by classifying user characteristic information included in the digital human; determining, by the server, user characteristic information that is of a digital human and corresponding to the query condition and the user characteristic identifier, obtaining a query result according to an access permission setting parameter of the user characteristic information of the digital human, and sending the query result to the terminal of the data requester; and receiving, by the server, a purchase request that is sent by the terminal of the data requester according to the query result, and completing a transaction according to the purchase request, where the purchase request is used to instruct to purchase the user characteristic information of the digital human corresponding to the query result.

In a first possible implementation manner of the second aspect, the sending, by the server, the query result to the terminal of the data requester includes determining, by the server according to the access permission setting parameter of the user characteristic information of the digital human, whether the terminal of the data requester can access the user characteristic information of the digital human; and if the terminal of the data requester can access the user characteristic information of the digital human, sending, by the server, the query result to the terminal of the data requester, where the query result includes at least one of the following results: a quantity of the user characteristic information of the digital human, and a part of user characteristic information of the digital human in the user characteristic information of the digital human.

According to the second aspect, or the first possible implementation manner of the second aspect, in a second possible implementation manner of the second aspect, the determining, by the server, user characteristic information that is of a digital human and corresponding to the query condition and the user characteristic identifier, and obtaining a query result according to an access permission setting parameter of the user characteristic information of the digital human includes determining at least two digital humans corresponding to the query condition; performing data mining analysis on user characteristic information, corresponding to the user characteristic identifier, in the at least two digital humans to obtain common user characteristic information; and obtaining the query result according to access permission setting parameters of pieces of user characteristic information included in the common user characteristic information.

According to the second aspect, or the first or the second possible implementation manner of the second aspect, in a third possible implementation manner of the second aspect, the query condition includes a retrieval keyword input by the data requester; the query condition includes the retrieval keyword and context environment information of the terminal of the data requester; or the query condition includes the retrieval keyword and at least one piece of user characteristic information included in a digital human corresponding to the data requester.

A third aspect of the embodiments of the present disclosure provides a data information transaction method, including receiving, by a server, a permission management request sent by a terminal of a data provider, where the permission management request includes an identifier of the data provider and an access permission setting parameter; and setting, by the server according to the access permission setting parameter, access permission for user characteristic information included in a digital human corresponding to the identifier of the data provider, where the digital human is used to describe, in a digital world environment, a characteristic of an actual user in the physical world, so that when receiving a query request that is sent by a terminal of a data requester and carries a query condition and a user characteristic identifier of a digital human that needs to meet the query condition, and determining user characteristic information that is of a digital human and corresponding to the query condition and the user characteristic identifier, the server obtains a query result according to an access permission setting parameter of the user characteristic information of the digital human, and sends the query result to the terminal of the data requester.

In a first possible implementation manner of the third aspect, before the setting, by the server according to the access permission setting parameter, access permission for user characteristic information included in a digital human corresponding to the identifier of the data provider, the method further includes performing, by the server, identity authentication on the data provider according to the identifier of the data provider, and after the authentication succeeds, performing the step of setting, according to the access permission setting parameter, access permission for user characteristic information included in a digital human corresponding to the identifier of the data provider.

According to the third aspect, or the first possible implementation manner of the third aspect, in a second possible implementation manner of the third aspect, before the receiving, by a server, a query request sent by a terminal of a data provider, the method further includes acquiring, by the server, a data source, and extracting a digital human according to the data source, where the data source is user data of the actual user.

According to the data information transaction method and system that are provided in the embodiments of the present disclosure, a digital human that describes a characteristic of an actual user is extracted according to user data of the actual user in the physical world, where the digital human includes user characteristic information that represents a characteristic of the corresponding actual user; and the included user characteristic information is classified to obtain a user characteristic identifier of each category of user characteristic information. Therefore, when a requester sends a query request by using a terminal of the requester, in addition to a universal query condition, the query request further includes a user characteristic identifier of a digital human that needs to meet the query condition. The server determines, by means of a query according to the query condition and the user characteristic identifier, corresponding user characteristic information of a digital human, further obtains, according to an access permission setting parameter of the user characteristic information of the digital human determined by means of the query, a query result convergent to the query condition and the user characteristic identifier, and sends the query result to the terminal of the data requester. Further, if the requester needs to purchase the user characteristic information of the digital human corresponding to the query result, the requester needs to send a purchase request, and completes a transaction according to the purchase request. By using the query condition and a user characteristic identifier that represents a user characteristic category as factors of query convergence, a retrieval result of user characteristic information is more accurate; a query result to be pushed to a user is determined according to the access permission setting parameter of the retrieved user characteristic information of the digital human, which ensures effectiveness of the query result. Because the digital human is pre-extracted from the user data of the actual user, a set of to-be-queried information includes more effective available information, which not only ensures accuracy of the query result but also is beneficial to improving query and search efficiency. Moreover, because the user characteristic information of the digital human obtained by means of the query indicates a characteristic of the actual user corresponding to the digital human, a purchase transaction manner is beneficial to ensuring legal interests and information security of the actual user.

BRIEF DESCRIPTION OF DRAWINGS

FIG. 1 is a flowchart of a data information transaction method according to an embodiment of the present disclosure;

DESCRIPTION OF EMBODIMENTS

Figure 2:
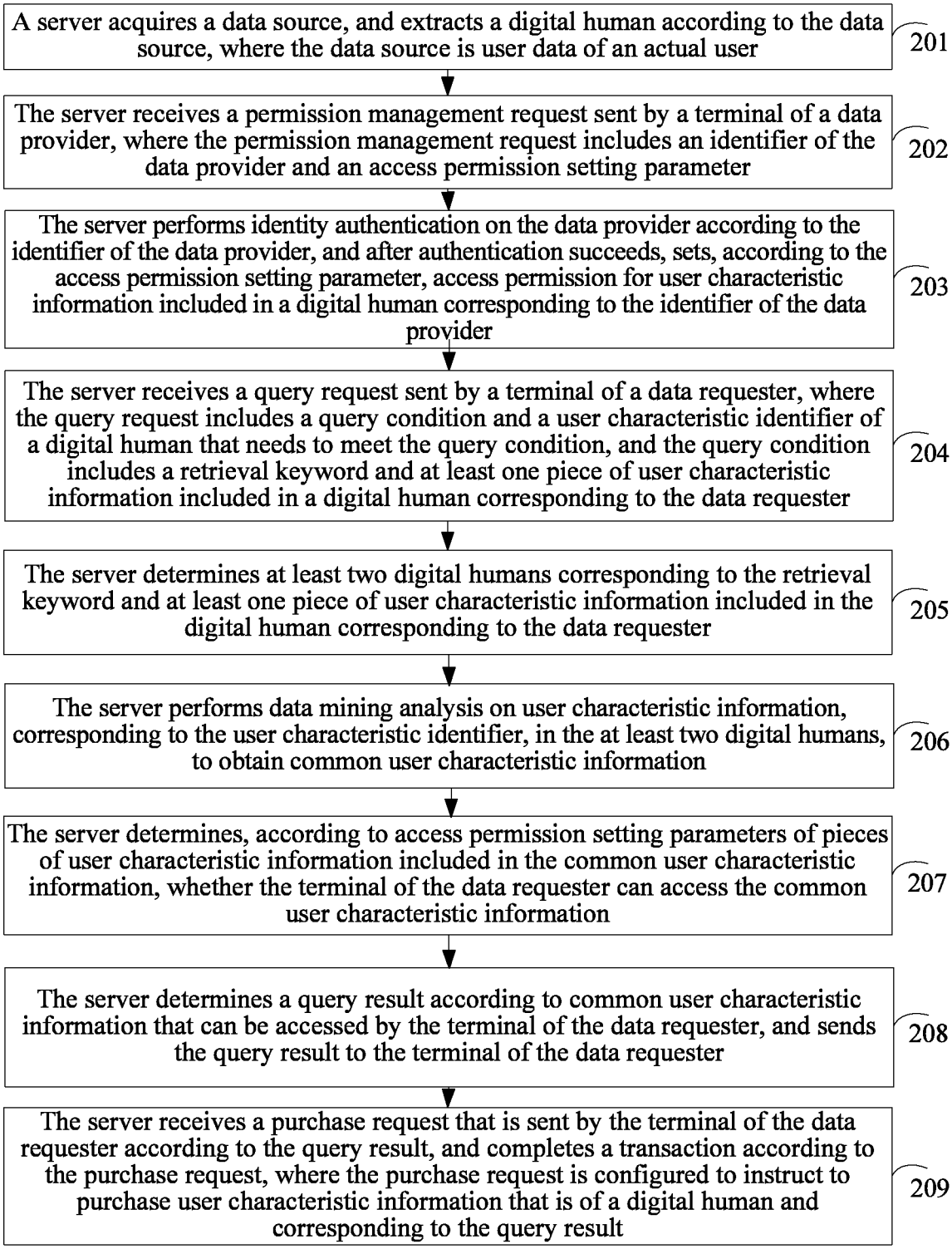
FIG. 2 is a flowchart of a data information transaction method according to an embodiment of the present disclosure.

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are a part rather than all of the embodiments of the present disclosure. All other embodiments obtained by persons of ordinary skill in the art based on the embodiments of the present disclosure without creative efforts shall fall within the protection scope of the present disclosure.

FIG. 1 is a flowchart of a data information transaction method according to a first embodiment of the present disclosure. The method provided in this embodiment is implemented by a transaction system. Specifically, in this embodiment, a specific implementation manner of the method is described by using a server included in the transaction system as an execution body. As shown in FIG. 1, the method includes:

101. The server receives a query request sent by a terminal of a data requester, where the query request includes a query condition and a user characteristic identifier of a digital human that needs to meet the query condition, the digital human is used to describe, in a digital world environment, a characteristic of an actual user in the physical world, and the user characteristic identifier is a characteristic category identifier obtained by classifying user characteristic information included in the digital human.

102. The server determines user characteristic information that is of a digital human and corresponding to the query condition and the user characteristic identifier, obtains a query result according to an access permission setting parameter of the user characteristic information of the digital human, and sends the query result to the terminal of the data requester.

103. The server receives a purchase request that is sent by the terminal of the data requester according to the query result, and completes a transaction according to the purchase request, where the purchase request is used to instruct to purchase the user characteristic information of the digital human corresponding to the query result.

The server in this embodiment is a service platform that provides a function of retrieving user characteristic information. The service platform possesses a large quantity of pieces of data related to a user trail, such as a record of using application software by a user, a record of purchasing a product by a user, and a record of a social activity of a user, and mines data related to a user trail so as to extract information that indicates a user characteristic and related knowledge, such as a user's behavioral habit, a user's shopping preference, and a situation of a user's social circle. Because the user characteristic information is a characteristic to which data related to a user trail in a real physical world is mapped in a digital world in a manner of mining data, in this embodiment, a "digital human" virtualized in the digital world is used to represent a characteristic of the actual user in the physical world, that is, the digital human includes pieces of user characteristic information that represent a characteristic of a corresponding actual end user. In this embodiment, performing data mining on data related to a user trail may use the following data mining algorithms, such as a classification algorithm, a clustering algorithm, a regression algorithm, a reinforcement learning algorithm, a transfer learning algorithm, a depth learning algorithm, and an active learning algorithm.

In addition, because user data of the actual user includes data information in all aspects of the user, in this embodiment, classification is performed on the pieces of user characteristic information included in the digital human defined in the digital world; a classification basis is, for example, an application type, such as shopping, food consumption, physical health, or a communications service, corresponding to the user characteristic information. Classification is performed on the pieces of user characteristic information to obtain a user characteristic identifier that represents each category of characteristic. In embodiments of the present disclosure, user data may include trail data of a user, or may be data generated in a process in which a user uses a terminal. Generally, for a same actual user, under a user characteristic identifier in a digital human corresponding to the actual user, multiple pieces of user characteristic information are included in most cases; for example, when a user characteristic identifier is food consumption, under the identifier, information about consumption in different cities, at different time, or in different restaurants may probably be included. In this embodiment, preferably, in order that an actual user can subsequently perform access management on pieces of user characteristic information included in a digital human corresponding to the actual user, user characteristic information of each actual user is stored in a storage database of the server in a unit of a digital human.

When a data requester needs to obtain, by means of a query, some pieces of user characteristic information that are stored in the server and meet a requirement of the data requester, the data requester sends a query request to the server by using a terminal device of the data requester, that is, a terminal of the data requester. Specifically, the server in this embodiment provides an information requester with a query interface or a user interface, for example, an application programming interface (API); therefore, the data requester may send a query request to the server by using the API, where the query request includes a query condition and a user characteristic identifier of a digital human that needs to meet the query condition. The query condition, for example, includes a retrieval keyword input by the data requester, or includes the retrieval keyword and context environment information of the terminal of the data requester. The context environment information of the terminal of the data requester is, for example, information about time and a location, that is, when the data requester arrives at which place. The context environment information may be used to provide a more personalized retrieval result for a requester. Acquiring the context environment information may be implemented in multiple manners, for example, the terminal of the data requester actively reports information about a geographical location at which the terminal of the data requester is located, or the server indirectly acquires the context environment information by analyzing information such as an IP address of the terminal of the data requester or a cookie, which is not specially limited in the present disclosure.

For example, if the data requester wants to obtain, by means of a query, a restaurant to which a specific user usually visits, a retrieval keyword input by the data requester in a query condition is a name of the specific user, and a user characteristic identifier is food consumption, so that the server determines a corresponding digital human, that is, the digital human corresponding to the specific user, according to the query condition, that is, the retrieval keyword, thereby determining, according to the user characteristic identifier and from pieces of user characteristic information included in the digital human, at least one piece of user characteristic information, that is, user characteristic information of a digital human, corresponding to the user characteristic identifier. For another example, when the data requester goes to Shenzhen on business, the data requester expects to acquire a restaurant to which a specific user usually visits when going to the place on business; then, a retrieval keyword input by the data requester in a query condition is a name of the specific user, the context environment information of the terminal of the data requester is input in the query condition, for example, a location of a city in which the terminal of the data requester is currently located is Shenzhen, and an input user characteristic identifier is food consumption, so that the server determines a corresponding digital human, that is, the digital human corresponding to the specific user, according to the query condition, that is, the retrieval keyword, thereby determining, according to the user characteristic identifier and from pieces of user characteristic information included in the digital human, at least one piece of user characteristic information corresponding to the user characteristic identifier. For another example, when the data requester goes to Shenzhen on business, the data requester expects to acquire a food consumption habit of a person who has a same income and position as the data requester; a retrieval keyword input by the data requester is, for example, 300-500 yuan per capita, the context environment information of the terminal of the data requester is input, for example, a location of a city in which the terminal of the data requester is currently located is Shenzhen, and consumption time is 17:00-21:00, and a user characteristic identifier input by the data requester is food consumption, so that the server determines at least one corresponding digital human according to the retrieval keyword and the context environment information in the query condition and further determines, from pieces of user characteristic information included in each determined digital human, pieces of user characteristic information corresponding to the user characteristic identifier.

Further, after obtaining corresponding user characteristic information of a digital human by means of a query according to a query condition and a user characteristic identifier that are included in a query request sent by the terminal of the data requester, the server needs to obtain a query result according to an access permission setting parameter of the user characteristic information of the digital human, and further send the query result to the terminal of the data requester. In this embodiment, access permission setting parameters are preferably configured for pieces of user characteristic information that are included in a digital human corresponding to each actual user and are stored in the server; the parameters may be preset by the server according to different categories of pieces of user characteristic information, or may be actively set by an actual user corresponding to each digital human. For example, an access permission setting parameter of user characteristic information includes whether the user characteristic information is allowed to be accessed, a user identifier that is allowed to access, a price that needs to be paid so as to access the user characteristic information, and the like. It may be understood that, in this embodiment, after the server obtains, by means of a search, user characteristic information that is of a digital human and corresponding to a query condition and a user characteristic identifier, because the user characteristic information of the digital human may probably include multiple pieces of user characteristic information, and an access permission setting parameter of each piece of user characteristic information is different, user characteristic information of a digital human that is obtained by the server according to an access permission setting parameter of the digital human and is corresponding to a query result pushed to the data requester may probably be different from user characteristic information of a digital human determined according to the query condition and the user characteristic identifier, that is, a quantity of user characteristic information of a digital human that is obtained by the server according to an access permission setting parameter of the digital human and is corresponding to a query result pushed to the data requester may probably be less than a quantity of user characteristic information of a digital human determined according to the query condition and the user characteristic identifier. It should be noted that, in this embodiment, when access permission setting parameters of pieces of user characteristic information of a digital human determined according to the query condition and the user characteristic identifier all represent that the query result can be pushed to the terminal of the data requester, the query result is, for example, a quantity of pieces of user characteristic information of a digital human obtained by means of a query, or a part of user characteristic information of a digital human obtained by means of a query, or the query result is, for example, a quantity of a part of user characteristic information of a digital human that can be sent to the terminal of the data requester, which is represented by the access permission setting parameter of user characteristic information of a digital human determined according to the query condition and the user characteristic identifier, or a part of user characteristic information. In addition, preferably, that part of user characteristic information of a digital human is user characteristic information that may be visible in public to any user. In this embodiment, a reason for optionally sending, in an indirect manner to the terminal of the data requester, the user characteristic information of the digital human obtained by means of the query is that the user characteristic information of the digital human reflects a characteristic, such as a behavioral habit, which belongs to individual privacy, of an actual end user corresponding to the digital human. However, for another user, the information is also information that has a significant reference value. Therefore, to ensure interests of the actual end user and that a requester can obtain valuable information, in this embodiment, when the data requester determines that the user characteristic information of the digital human found by the server needs to be used, a purchase request that instructs to purchase user characteristic information of a digital human that is corresponding to a query result is sent to the server according to the query result, so that the server completes, according to the purchase request, a transaction of the user characteristic information of the digital human between an actual user corresponding to the digital human and the data requester.

Specifically, the server needs to provide an electronic payment function. When the data requester selects and determines to purchase related user characteristic information of a digital human, the server provides a transaction payment function, acquires an amount of electronic payment from the data requester by using an API, and correspondingly implements, by using another API between the server and the actual user, a specific amount of electronic payment to the actual user corresponding to the digital human.

In this embodiment, a digital human that describes a characteristic of an actual user is extracted according to user data of an actual end user in the physical world, the digital human includes pieces of user characteristic information that represent a characteristic of the corresponding actual user, and classification is performed on the included pieces of user characteristic information to obtain a user characteristic identifier of each category of user characteristic information. Therefore, when a requester sends a query request by using a terminal of the requester, in addition to a universal query condition, the query request further includes a user characteristic identifier of a digital human that needs to meet the query condition. The server determines, by means of a query according to the query condition and the user characteristic identifier, corresponding user characteristic information of a digital human, further obtains, according to an access permission setting parameter of the user characteristic information of the digital human determined by means of the query, a query result convergent to the query condition and the user characteristic identifier, and sends the query result to a terminal of the data requester. Further, if the requester needs to purchase the user characteristic information of the digital human corresponding to the query result, the requester needs to send a purchase request, and completes a transaction according to the purchase request. By using the query condition and a user characteristic identifier that represents a user characteristic category as factors of query convergence, a retrieval result of user characteristic information is more accurate; a query result to be pushed to a user is determined according to the access permission setting parameter of the retrieved user characteristic information of a digital human, which ensures effectiveness of the query result; because the digital human is pre-extracted from the user data of the actual user, a set of to-be-queried information includes more effective available information, which not only ensures accuracy of the query result but also is beneficial to improving query and search efficiency. Moreover, because the user characteristic information of the digital human obtained by means of the query indicates a characteristic of the actual user corresponding to the digital human, a purchase transaction manner is beneficial to ensuring legal interests and information security of the actual end user.

FIG. 2 is a flowchart of a data information transaction method according to a second embodiment of the present disclosure. As shown in FIG. 2, the method includes:

201. A server acquires a data source, and extracts a digital human according to the data source, where the data source is user data of an actual user.

With further popularity of a mobile terminal and the mobile Internet, data of an end user increases explosively, and massive pieces of data are distributed and scattered in each corner of an individual digital life. For example, people make friends and establish a friend circle by using a social network, post a personal opinion about a social event by posting a microblog to generate Me media and establish a public image of an individual, obtain various products and services by means of online shopping, are involved in managing personal assets by means of online banking, and take a photo or a video anywhere at any time by using a personal mobile phone terminal to record and share ups and downs of life, and people sense personal sign data by using a wearable terminal to monitor health. Behind these pieces of data of an end user on a network, various characteristics, such as a person's interest, hobby, opinion, habit, family, and health, that represent properties of a biological individual are hidden, and form characteristic data of an actual user. In this embodiment, user data is generated when network application of a user is acquired from various network application platforms, and the server performs data mining, by means of a big data analysis technology, on data sources that include these pieces of user data, so as to extract, from the data sources, a digital human that is corresponding to each actual user and includes pieces of user characteristic information of the actual user and store, in a local database, the digital human obtained by means of extraction. Specifically, pieces of user data that belong to a same actual user may be determined by means of recognition. For the same actual user, data mining is performed on the pieces of user data of the same actual user to obtain corresponding digital human information, that is, various categories of user characteristic information included in a corresponding digital human.

Therefore, a storage correspondence is established in the local database and between an identifier of an actual user and a corresponding digital human, and pieces of user characteristic information of the corresponding digital human are stored in storage space corresponding to a user identifier corresponding to the actual user.

It should be noted that, these pieces of mined user characteristic information in a digital human belong to individual privacy of an actual user in essence, and an individual user has permission to occupy, use, profit from, and dispose of user characteristic information of the user.

However, in the field of technologies for applying Internet big data, these pieces of mined user characteristic information are directly used by various business platforms for accurate service positioning, advertising promotion, information transacting, and the like, and a behavior such as using or transacting user characteristic information of an owner without an agreement from the owner of the user characteristic information directly invades privacy of the owner; therefore, there is a problem of low security in user's privacy.

To resolve the foregoing problem of low security in user's privacy in the prior art, in this embodiment, after the server extracts a digital human according to a data source and saves the digital human locally, the server may further push, according to user identifiers of actual users respectively corresponding to digital humans, a message to a terminal of a user corresponding to each user identifier, so as to instruct an end user to perform setting of a permission management parameter on user characteristic information of the end user. Specific implementation thereof includes the following:

202. The server receives a permission management request sent by a terminal of a data provider, where the permission management request includes an identifier of the data provider and an access permission setting parameter.

203. The server performs identity authentication on the data provider according to the identifier of the data provider, and after authentication succeeds, sets, according to the access permission setting parameter, access permission for user characteristic information included in a digital human corresponding to the identifier of the data provider.

In this embodiment, the foregoing data provider is an actual user corresponding to a digital human stored in the server, and to implement, by the data provider, access permission management on pieces of user characteristic information in the digital human corresponding to the data provider, the data provider sends a permission management request that carries the identifier of the data provider and an access permission setting parameter to the server by using the terminal of the data provider. First, the server performs identity authentication on the data provider according to the identifier of the data provider, so as to determine whether the data provider is a legal user and whether the data provider has permission to perform permission setting, and management, such as modification and editing, on the pieces of user characteristic information in the corresponding digital human. If the authentication fails, the server feeds back an error prompt; if the authentication succeeds, the server further sets access permission of corresponding user characteristic information according to the access permission setting parameter carried in the permission management request, where the access permission includes whether access is allowed to be purchased, a user that is allowed to access or purchase, an acceptable payment amount for purchasing, whether editing and modifying, by a legal user, user characteristic information corresponding to the legal user are allowed, and the like.

It should be noted that, in this embodiment, for pieces of user characteristic information included in a digital human and for an objective of protecting privacy, editing, adding, and deleting by an actual user corresponding to the digital human may be allowed. The actual user corresponding to the digital human may modify, add, and delete user characteristic information obtained by the server by mining a data source, and a platform may mark all information that is modified manually, so as to be distinguished from data that is mined by a machine and automatically obtained by a system, that is, credibility and value levels of these two categories of data are different. Different access permission may be set for user characteristic information of different credibility or a different value level, which enables a requester to obtain more effective information in a case in which privacy security of an actual end user is ensured.

At this point, pieces of information about digital humans corresponding to actual users have been stored in the server, and access permission setting has been performed by the actual users respectively corresponding to the digital humans on pieces of user characteristic information corresponding to user characteristic identifiers included in the digital humans; therefore, the pieces of user characteristic information included in the digital humans may be used for subsequent transaction processing, so that another user can obtain, at a payment price, wanted and valuable user characteristic information.

204. The server receives a query request sent by a terminal of a data requester, where the query request includes a query condition and a user characteristic identifier of a digital human that needs to meet the query condition, and the query condition includes the retrieval keyword and at least one piece of user characteristic information included in a digital human corresponding to the data requester.

Based on the embodiment shown in FIG. 1, in this embodiment, the query condition may include a retrieval keyword input by the data requester, may include a retrieval keyword and context environment information of the terminal of the data requester, or may include a retrieval keyword and at least one piece of user characteristic information included in a digital human corresponding to the data requester. In actual application, user characteristic information determined according to a query condition and a user characteristic identifier may probably be corresponding to multiple different digital humans; therefore, optionally, in this embodiment, when user characteristic information that belongs to multiple digital humans may be obtained, the following processing may further be performed. In the following, only that the query condition is the retrieval keyword and at least one piece of user characteristic information included in a digital human corresponding to the data requester is used as an example for description, and it may be understood that a same processing process is applicable to a case in which the query condition is another one.

In this embodiment, the server may further acquire a digital human corresponding to a data requester corresponding to a terminal of the data requester that sends a query request, so as to obtain, by means of retrieval according to at least one piece of user characteristic information that is included in the digital human corresponding to the data requester and that the data requester expects to query, a category of digital human that has a corresponding characteristic matched with the digital human, and perform secondary mining on multiple digital humans obtained by means of the retrieval, so as to obtain common characteristic information that is of a specific group of people and is corresponding to a user characteristic identifier included in the query request, for example, it is expected that which restaurant that a user group that has a similar flavor with the data requester likes most is retrieved. Specific implementation thereof includes the following:

205. The server determines at least two digital humans corresponding to the retrieval keyword and at least one piece of user characteristic information included in a digital human corresponding to the data requester.

206. The server performs data mining analysis on user characteristic information, corresponding to the user characteristic identifier, in the at least two digital humans to obtain common user characteristic information.

The query result is, for example, a quantity of the common user characteristic information determined by means of a query, or a part of user characteristic information in the common user characteristic information determined by means of a query.

207. The server determines, according to access permission setting parameters of pieces of user characteristic information included in the common user characteristic information, whether the terminal of the data requester can access the common user characteristic information.

208. The server determines a query result according to common user characteristic information that can be accessed by the terminal of the data requester, and sends the query result to the terminal of the data requester.

209. The server receives a purchase request that is sent by the terminal of the data requester according to the query result, and completes a transaction according to the purchase request, where the purchase request is used to instruct to purchase the user characteristic information of the digital human corresponding to the query result.

Further, after the server obtains common user characteristic information convergent to the query condition and the user characteristic identifier, because user characteristic information included in the common user characteristic information may probably be corresponding to multiple different digital humans, the server needs to further determine, according to an access permission setting parameter of the common user characteristic information in the different digital humans, whether the data requester can access each piece of user characteristic information in the common user characteristic information, determines, according to the user characteristic information that can be accessed, a query result, for example, a quantity of pieces of user characteristic information that can be accessed or a part of user characteristic information that can be accessed, further sends the query result to the terminal of the data requester, and completes a transaction process when receiving a purchase request sent by the terminal of the data requester.

In this embodiment, multiple different query conditions are provided, so that a data requester can obtain a personalized query result that meets a requirement of the data requester, and moreover, context environment information and characteristic information of a digital human of the data requester are beneficial to obtaining more accurate user characteristic information by a requester; data mining is further performed on found user characteristic information that belongs to multiple digital humans to obtain common user characteristic information, so that the data requester can obtain user characteristic information that more matches the requirement; an actual user serving as a data provider can perform access permission setting on pieces of user characteristic information included in a digital human corresponding to the actual user, which is beneficial to ensuring privacy security of an actual end user.

Figure 3:
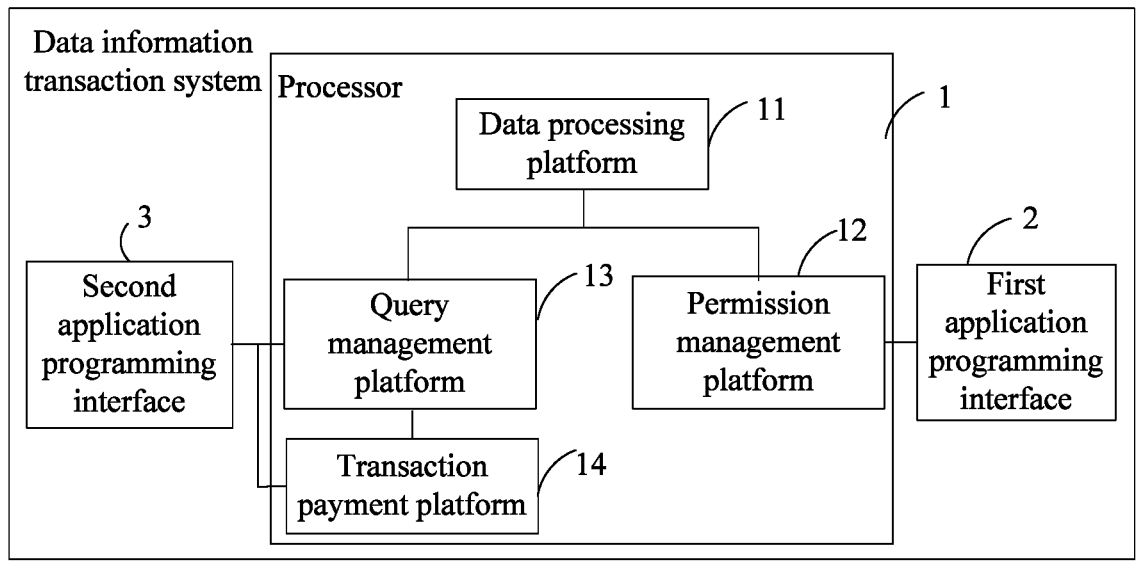
FIG. 3 is a schematic structural diagram of a data information transaction system according to an embodiment of the present disclosure.

FIG. 3 is a schematic structural diagram of a data information transaction system according to a third embodiment of the present disclosure. As shown in FIG. 3, the system includes a processor 1, where the processor 1 is corresponding to the server in the embodiment shown in FIG. 1 or FIG. 2, and the processor 1 includes a data processing platform 11, configured to acquire a data source, and extract a digital human according to the data source, where the data source is user data of an actual user, and the digital human is configured to describe, in a digital world environment, a characteristic of the actual user in the physical world; a permission management platform 12, where there is a first API 2 between the permission management platform 12 and a terminal of a data provider, and the permission management platform 12 receives, by using the first API 2, a permission management request that is sent by the terminal of the data provider and carries an identifier of the data provider and an access permission setting parameter, and sets, according to the access permission setting parameter, access permission for user characteristic information included in a digital human corresponding to the identifier of the data provider; a query management platform 13, where there is a second API 3 between the query management platform 13 and a terminal of a data requester, the query management platform 13 receives, by using the second API 3, a query request that is sent by the terminal of the data requester and carries a query condition and a user characteristic identifier of a digital human that needs to meet the query condition, determines user characteristic information that is of a digital human and corresponding to the query condition and the user characteristic identifier, obtains a query result according to an access permission setting parameter of the user characteristic information of the digital human, and sends the query result to the terminal of the data requester, where the user characteristic identifier is a characteristic category identifier obtained by classifying user characteristic information included in the digital human; and a transaction payment platform 14, where there is the second API 3 between the transaction payment platform 14 and the terminal of the data requester, the transaction payment platform 14 receives, by using the second API 3, a purchase request that is sent by the terminal of the data requester according to the query result, and completes a transaction according to the purchase request, where the purchase request is used to instruct to purchase the user characteristic information of the digital human corresponding to the query result.

The transaction system in this embodiment may be configured to implement the technical solutions in the method embodiment shown in FIG. 1, and implementation principles and technical effects of the transaction system are similar and not described herein again.

Figure 4:
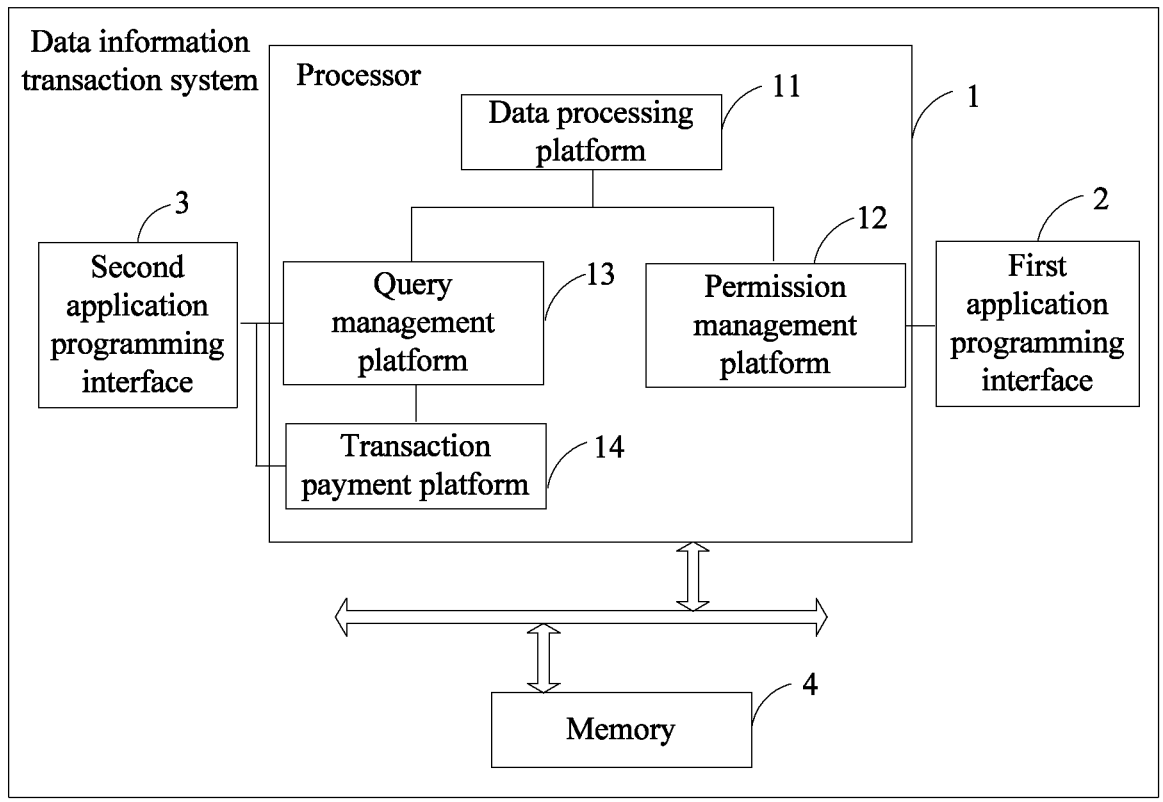
FIG. 4 is a schematic structural diagram of a data information transaction system according to an embodiment of the present disclosure.

FIG. 4 is a schematic structural diagram of a data information transaction system according to a fourth embodiment of the present disclosure. As shown in FIG. 4, the system in this embodiment is based on the embodiment shown in FIG. 3, and the query management platform 13 is further configured to determine, according to the access permission setting parameter of the user characteristic information of the digital human, whether the terminal of the data requester can access the user characteristic information of the digital human; and if the terminal of the data requester can access the user characteristic information of the digital human, send the query result to the terminal of the data requester; where the query result includes at least one of the following results: a quantity of the user characteristic information of the digital human, and a part of user characteristic information of the digital human in the user characteristic information of the digital human.

Further, the query management platform 13 is further configured to determine at least two digital humans corresponding to the query condition; perform data mining analysis on user characteristic information, corresponding to the user characteristic identifier, in the at least two digital humans to obtain common user characteristic information; and obtain the query result according to access permission setting parameters of pieces of user characteristic information included in the common user characteristic information.

Further, the query management platform 13 is further configured to determine the at least two digital humans corresponding to the query condition, where the query condition includes a retrieval keyword input by the data requester, the query condition includes the retrieval keyword and context environment information of the terminal of the data requester, or the query condition includes the retrieval keyword and at least one piece of user characteristic information included in a digital human corresponding to the data requester; perform data mining analysis on the user characteristic information, corresponding to the user characteristic identifier, in the at least two digital humans to obtain the common user characteristic information; and obtain the query result according to the access permission setting parameters of the pieces of user characteristic information included in the common user characteristic information.

Further, the permission management platform 12 is further configured to perform identity authentication on the data provider according to the identifier of the data provider, and after the authentication succeeds, perform the step of setting, according to the access permission setting parameter, access permission for user characteristic information included in a digital human corresponding to the identifier of the data provider.

Further, the transaction system further includes a memory 4, where the memory 4 is connected to the processor 1 by using a bus; and the memory 4 stores the data source obtained by the data processing platform 11 and the digital human extracted by the data processing platform 11 according to the data source.

The transaction system in this embodiment may be configured to implement the technical solutions in the method embodiment shown in FIG. 2, and implementation principles and technical effects of the transaction system are similar and not described herein again.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A data information transaction system for enabling owner privacy control of mineable personal online data, comprising:
    a processor;
    a server; and
    a memory, coupled to the processor and the server, comprising instructions that when executed by the processor, configure the server to:
        acquire a data source, wherein the data source is user data of an actual user;
        extract a digital human according to the data source, wherein the digital human comprises user characteristic information acquired from the user data of the actual user, wherein the digital human is configured to describe, in a digital world environment, a user characteristic of the actual user in a physical world, wherein a user characteristic identifier of a plurality of user characteristic identifiers is obtained by classifying categories of the user characteristic information included in the digital human, and wherein the user characteristic identifier comprises a communication identifier related to a communication service used by the actual user;
        store the data source and the digital human in the memory;
        push, to a first mobile terminal of a data provider according to the communication identifier, a notification message instructing the data provider to perform setting of a permission management parameter on the user characteristic information of the digital human, wherein the data provider is the actual user;
        receive, from the first mobile terminal using a first application programming interface (API), a permission management request by the data provider in response to receiving the notification message, wherein the permission management request comprises access permission setting parameters defining access permissions associated with the user characteristic information of the digital human and at least one of adding, deleting or editing the access permissions associated with the user characteristic information of the digital human by the data provider;
        perform, using the communication service, identity authentication on the data provider according to the communication identifier of the data provider;
        set, according to the access permission setting parameters, the access permissions for the user characteristic information of the digital human corresponding to the communication identifier of the data provider;
        receive, using a second API, a query request from a second mobile terminal of a data requester, wherein the query request comprises a query condition and the user characteristic identifier of the digital human, wherein the query condition comprises a retrieval keyword and context environment information of the second mobile terminal of the data requester, and wherein the context environment information comprises a geographical location of a city at which the second mobile terminal of the data requester is currently located and information of an internet protocol (IP) address of the second mobile terminal of the data requester;
        determine at least two digital humans that correspond to the query condition;
        perform data mining analysis on the user characteristic information, corresponding to the user characteristic identifier, in the at least two digital humans to obtain common user characteristic information, wherein the data mining analysis is performed using a data mining algorithm comprising a reinforcement learning algorithm, a transfer learning algorithm, a depth learning algorithm, or an active learning algorithm;

obtain a query result according to the access permission setting parameters of the user characteristic information comprised in the common user characteristic information;

send the query result to the second mobile terminal of the data requester when the second mobile terminal of the data requester can access the user characteristic information of the digital human, wherein the query result comprises the common user characteristic information;

receive a purchase request received from the second mobile terminal of the data requester according to the query result, wherein the purchase request is configured to instruct to purchase the user characteristic information of the digital human corresponding to the query result; and complete a transaction according to the purchase request so as to permit the second mobile terminal of the data requester to access user characteristic information of the actual user according to the access permissions defined by the actual user.

2. The data information transaction system of claim 1, wherein the processor is further configured to:

determine, according to the access permission setting parameters of the user characteristic information comprised in the common user characteristic information, when the second mobile terminal of the data requester can access the user characteristic information of the at least two digital humans; and send the query result to the second mobile terminal of the data requester when the second mobile terminal of the data requester can access the user characteristic information of the digital human, wherein the query result comprises a quantity of the common user characteristic information of the at least two digital humans.

3. The data information transaction system of claim 1, wherein the processor is further configured to:

determine, according to the access permission setting parameters of the user characteristic information comprised in the common user characteristic information, when the second mobile terminal of the data requester can access the user characteristic information of the digital human; and send the query result to the second mobile terminal of the data requester when the second mobile terminal of the data requester can access the user characteristic information of the digital human, wherein the query result further comprises a portion of the common user characteristic information of the at least two digital humans.

4. The data information transaction system of claim 1, wherein the processor is further configured to obtain the query result according to the access permission setting parameters of characteristics of the user characteristic information comprised in the common user characteristic information.

5. The data information transaction system of claim 4, wherein the query condition comprises the retrieval keyword that is input into a search engine by the data requester.

6. The data information transaction system of claim 1, wherein the user data comprises a user trail record of behavioral habit data or shopping preference data of the actual user at different times.

7. The data information transaction system of claim 1, wherein the user data comprises a user trail record of application software used by the actual user at different times.

8. The data information transaction system of claim 1, wherein the user data comprises a user trail record of products purchased by the actual user at different times.

9. A data information transaction method for enabling owner privacy control of mineable personal online data, the method comprising:

acquiring, by the server, a data source, wherein the data source is user data of an actual user;

extracting, by the server, a digital human according to the data source, wherein the digital human comprises user-characteristic information acquired from the userdata, wherein the digital human comprises, in a digital world environment, a characteristic of the actual user in a physical world, wherein a user characteristic identifier of a plurality of user characteristic identifiers is obtained by classifying categories of the user characteristic information included in the digital human, and wherein the user characteristic identifier comprises a communication identifier related to a communication service used by the actual user;

storing, in a memory of the server, the data source and the digital human;

pushing, by the server to a first mobile terminal of a data provider according to the communication identifier, a notification message instructing the data provider to perform setting of a permission management parameter on the user characteristic information of the digital human, wherein the data provider is the actual user;

receiving, at the server and from the first mobile terminal using a first application programming interface (API), a permission management request by the data provider in response to receiving the notification message, wherein the permission management request comprises access permission setting parameters defining access permissions associated with the user characteristic information of the digital human and a at least one of adding, deleting or editing the access permissions associated with the user characteristic information of the digital human by the data provider;

performing, by the server and using the communication service, identity authentication on the data provider according to the communication identifier of the data provider;

setting, by the server and according to the access permission setting parameters, the access permissions for the user characteristic information of the digital human corresponding to the communication identifier of the data provider;

receiving, by the server using a second API, a query request from a second mobile terminal of a data requester, wherein the query request comprises a query condition and the user characteristic identifier of the digital human that needs to meet the query condition, wherein the query condition comprises a retrieval keyword and context environment information of the second mobile terminal of the data requester, and wherein the context environment information comprises a geographical location of a city at which the second mobile terminal of the data requester is currently located and information of an internet protocol (IP) address of the second mobile terminal of the data requester;

determining, by the server, at least two digital humans corresponding to the query condition;

performing, by the server, data mining analysis on the user characteristic information, corresponding to the user characteristic identifier, in the at least two digital humans to obtain common user characteristic information, wherein the data mining analysis is performed using a data mining algorithm comprising a reinforcement learning algorithm, a transfer learning algorithm, a depth learning algorithm, or an active learning algorithm;

obtaining, by the server, a query result according to the access permission setting parameters of the user characteristic information comprised in the common user characteristic information;

sending, by the server, the query result to the second mobile terminal of the data requester so as to permit the second mobile terminal of the data requester to access the user characteristic information of the actual user according to the access permissions defined by the actual user;

receiving, by the server, a purchase request received from the second mobile terminal of the data requester according to the query result, wherein the purchase request is configured to instruct to purchase the user characteristic information of the digital human corresponding to the query result; and completing a transaction, by the server, according to the purchase request so as to permit the second mobile terminal of the data requester to access user characteristic information of the actual user according to the access permissions defined by the actual user.

10. The data information transaction method of claim 9, wherein sending the query result comprises:

determining, by the server and according to the access permission setting parameters of the user characteristic information comprised in the common user characteristic information, that the second mobile terminal of the data requester can access the user characteristic information of the at least two digital humans; and sending, by the server, the query result to the second mobile terminal of the data requester, wherein the query result comprises a quantity of the common user characteristic information of the at least two digital humans.

11. The data information transaction method of claim 9, wherein sending the query result comprises:

determining, by the server and according to the access permission setting parameters of the user characteristic information comprised in the common user characteristic information, that the second mobile terminal of the data requester can access the user characteristic information of the at least two digital humans; and sending, by the server, the query result to the second mobile terminal of the data requester, wherein the query result comprises a portion of the common user characteristic information of the digital human in the user characteristic information of the at least two digital humans.

12. The data information transaction method of claim 9, wherein obtainingthe query resultfurther comprises:obtaining, by the server, the query result according to access permission setting parameters of characteristics of the user characteristic information comprised in the common user characteristic information.

13. The data information transaction method of claim 9, wherein the query condition comprises the retrieval keyword that is input into a search engine by the data requester.

14. The data information transaction method of claim 9, wherein the user data comprises a user trail record of behavioral habit data or shopping preference data of the actual user at different times.

15. The data information transaction method of claim 9, wherein the user data comprises a user trail record of application software used by the actual user at different times.

16. The data information transaction method of claim 9, wherein the user data comprises a user trail record of products purchased by the actual user at different times.

\* \* \* \* \*

UNITED STATES PATENT AND TRADEMARK OFFICE
CERTIFICATE OF CORRECTION

PATENT NO. : 11,244,294 B2
APPLICATION NO. : 15/415970
DATED : February 8, 2022
INVENTOR(S) : Yingtao Li and Li Qian It is certified that error appears in the above-identified patent and that said Letters Patent is hereby corrected as shown below:

In the Claims

Claim 1, Column 16, Line 8: "characteristicof the actual" should read "characteristic of the actual"
Claim 1, Column 16, Line 9: "use rcharacteristic identifier" should read "user characteristic identifier"
Claim 1, Column 16, Lines 22 and 23: "management parameteron the user" should read "management parameter on the user"
Claim 1, Column 17, Line 20: "the data requesterto access" should read "the data requester to access"
Claim 1, Column 17, Lines 20 and 21: "user characteristicinformation of" should read "user characteristic information of"
Claim 5, Column 17, Line 59: "engine bythe data" should read "engine by the data"
Claim 9, Column 18, Line 9: "extracting, bythe server" should read "extracting, by the server"
Claim 9, Column 18, Line 10: "comprises user-" should read "comprises user"
Claim 9, Column 18, Line 11: "the userdata" should read "the user data"
Claim 9, Column 18, Line 23: "terminal ofa data" should read "terminal of a data"
Claim 9, Column 18, Line 24: "provideraccording to the" should read "provider according to the"
Claim 9, Column 18, Line 36: "human and a at least" should read "human and at least"
Claim 9, Column 18, Line 38: "the usercharacteristic information" should read "the user characteristic information"
Claim 9, Column 18, Line 47: "communication indentifierof the" should read "communication identifier of the"
Claim 9, Column 18, Line 50: "terminal ofa data" should read "terminal of a data"
Claim 12, Column 20, Line 18: "wherein obtainingthe query" should read "wherein obtaining the query"
Claim 12, Column 20, Line 18: "query resultfuther comprises" should read "query result further comprises"

Signed and Sealed this
Nineteenth Day of April, 2022

Katherine Kelly Vidal
*Director of the United States Patent and Trademark Office*